Aug. 30, 1932.   W. S. RALSTON   1,875,145
LIQUID LEVEL REGULATOR
Filed July 3, 1930   2 Sheets-Sheet 2
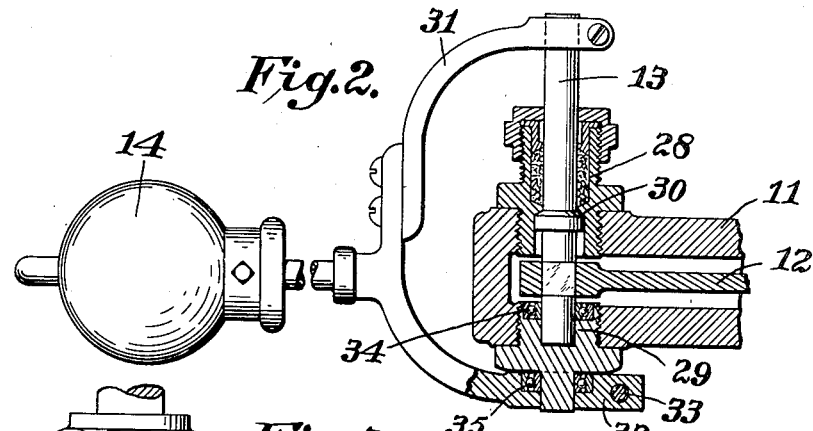
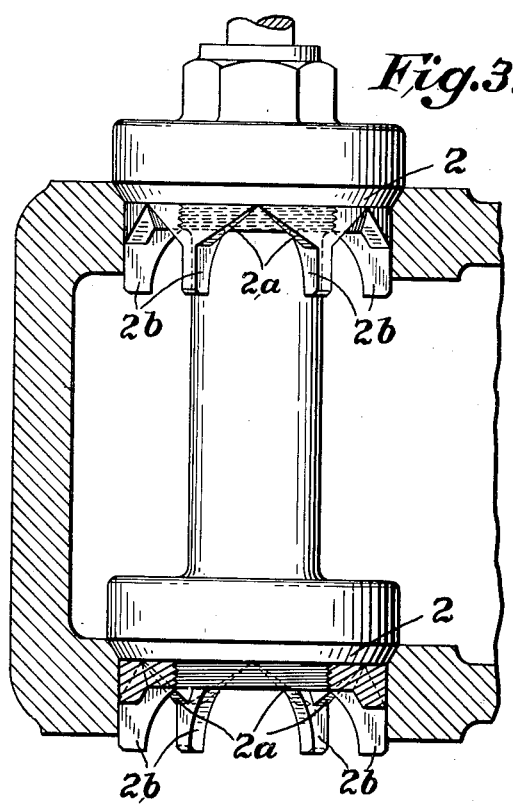
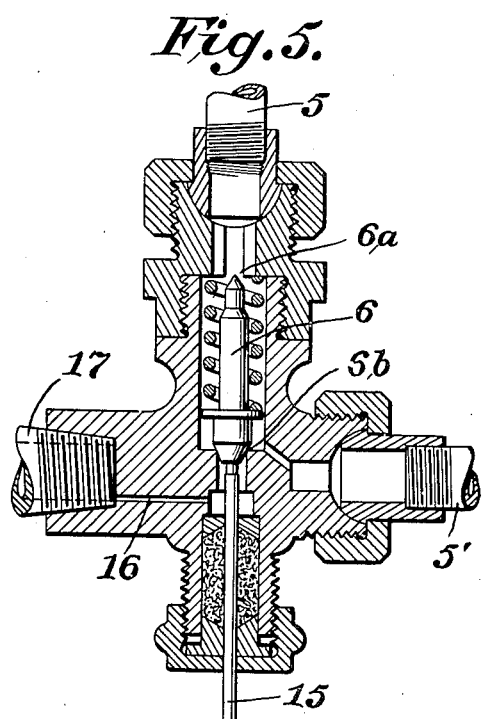
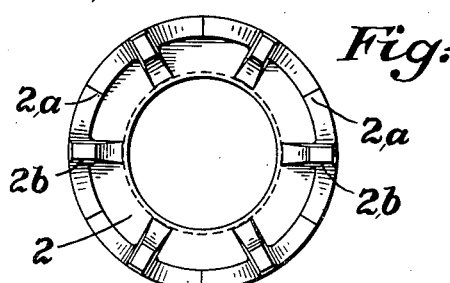
Inventor:
William S. Ralston,
By Spear, Middleton, Donaldson & Hall
Attys.

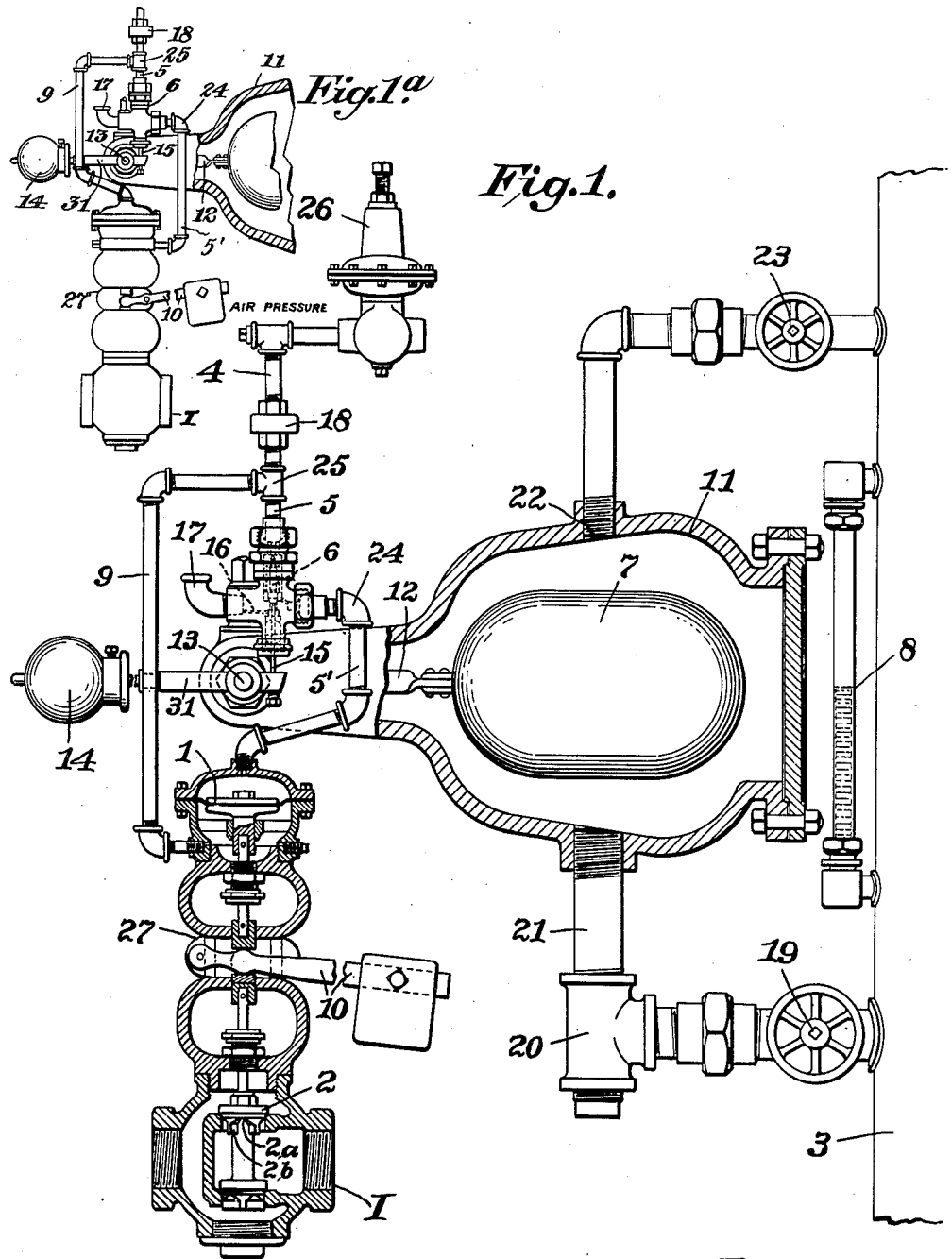

Patented Aug. 30, 1932

1,875,145

UNITED STATES PATENT OFFICE

WILLIAM S. RALSTON, OF PITTSBURGH, PENNSYLVANIA, ASSIGNOR TO THE CHAPLIN-FULTON MANUFACTURING COMPANY, OF PITTSBURGH, PENNSYLVANIA, A CORPORATION OF PENNSYLVANIA

LIQUID LEVEL REGULATOR

Application filed July 3, 1930. Serial No. 465,738.

This invention relates to improvements in liquid level regulators.

More particularly the invention relates to improvements in regulators of the liquid level in boilers, cracking stills, vaporizers, bubble towers, dephlegmators or the like, which regulators are operated by fluctuations in the liquid level to control the flow of liquid to or from the boiler or tower.

An object of the invention is to provide a regulator in which the flow controlling valve is differential in character, pressure being exerted on both sides of the diaphragm.

A further object is to provide such a valve in which the pressure on one side of the diaphragm is constant.

Another object is the provision of a regulator construction in which the flow of liquid maintaining the proper liquid level is continuous.

Another object is to provide simple means of adjustment of the regulator to adapt it for the control of inlet or outlet flow.

A further object is to provide a V-port type of flow control valve which will prevent wire drawing, and which will be effective for but half the travel thereof.

A still further object is the provision of a differential diaphragm flow valve and a constant pressure supply with means for applying the full constant pressure to one side of the diaphragm and means for varying said pressure applied to the opposite side of the diaphragm in accordance with the liquid level whereby the liquid level is substantially fixed and the flow is continuous.

Other objects will appear hereinafter.

The invention consists in the features, combination, and arrangement of parts hereinafter described and particularly pointed out in the claims.

The accompanying drawings are illustrative of one manner in which the invention may be carried out in which Figure 1 is a view of my improved continuous flow differential liquid level regulator with parts arranged or adjusted for control of outlet flow.

Fig. 1a is a small view showing the adjustments changing the device from control of outlet flow to control of inlet flow.

Fig. 2 is a plan view partly in section of the counterweighted lever and connections.

Fig. 3 is a sectional view of the double seated control valve having V-port valve wings attached.

Fig. 4 is a bottom plan of the V-port valve wing.

Fig. 5 is an enlarged sectional detail view of the actuating valve.

In the drawings, 1 represents the diaphragm, which is to be controlled by differential pressure in accordance with the present invention, to operate the flow controlling valve 2 which controls the flow to or from the tower or tank 3 containing the liquid the level 8 of which is to be maintained substantially fixed at a desired point.

A source of pressure is indicated at 4, which preferably is independent of any pressure developed in any medium in the tower 3. This may be air pressure, as indicated on the drawings, which is generated by some means independent of the tower or boiler 3.

This air pressure which is maintained constant is passed through strainer 18 and thence is delivered to both sides of the diaphragm. Interposed in the pipe 5 which supplies the pressure to the upper side of the diaphragm, is an actuating valve 6 which is operated by a weight, displacement body, or float 7 to vary the pressure applied to the upper side of the diaphragm in accordance with any changes in the liquid level 8.

The pipe 9 conducts the pressure to the under side of the diaphragm, and this pressure is maintained constant at say 50 lbs.

It will be apparent that the pressure applied to the upper side of the diaphragm when the liquid is low and the float is below horizontal with the actuating valve fully open, is the full 50 lbs. With low liquid level and float below horizontal, the air or gas pressure on both sides of the diaphgram is equalized. Air or gas pressure under the diaphragm being constant, the valve remains closed due to the overbalancing effect of the weight on the lever, and there is no flow.

When the liquid rises slightly, pressure port 6a is restricted sufficiently to reduce the pressure above the diaphragm of controlling valve to 20 lbs. This 20 lbs. pressure added to the weight on the lever, which is of the third order, both acting downward balances the 50 lbs. pressure under the diaphragm which acts upwards, with the control valve slightly one. The valve in the controlling valve is in absolute balance and is automatically held a given distance off its seat to maintain a fixed level. A tendency of the level to rise causes further restriction of port 6a, until the pressure above the diaphragm has dropped to 14 lbs., at which point the valve usually opens wide enough to take care of the maximum demand.

If the controlling valve is not sufficiently large to expel the liquid as fast as it entered the tank, the level in the tank would constantly rise, also the float would rise until valve 6a, in the actuating valve casing entirely closes. Then the pressure on the upper side of the controlling valve diaphragm would disappear entirely, due to escape through the restricted opening which leads to the exhaust, and the valve in the controlling valve remains wide open.

If the controlling valve is larger than necessary to expel the liquid as fast as it enters the tank, the valve in the controlling valve would operate close to its seat if it were not for the V-port type of control valve 2. The advantage of the V-port valve lies not only in securing good regulation under light loads, but also in the fact that it eliminates the whistling noise which is sometimes noticeable in regulators when the valve is close to its seat.

To secure ideal regulation when handling either high or low pressures the valve should be about half open. The V-port valve area at this point is equal to the sectional area of the pipe; but as the valve moves toward its seat the area of the opening diminishes rapidly as shown by the inverted V openings 2a in the valve wing of Figs. 3 and 4, so that when the minimum load is being delivered, the valve is a sufficient distance off its seat to prevent wire drawing of the valve.

My semi-V-port valve is only effective between tight closed position and half open position to vary the flow over that of a similar valve without the V-port and of uniform opening equal to the widest portion of the V-port. From the half open position of the semi-V-port valve to wide open position, the V-port portion would have no effect to increase the absorption or flow; that is, the variation in drop in pressure from the inlet to outlet of the valve body and the variation in flow by opening the V-port valve wider than the half open position is the same as with a similar valve of uniform opening without the V-port feature. The construction of the semi-V-port valve wing is shown in Figs. 3 and 4 which clearly shows the inverted V shaped openings 2a extending for half the depth of the wings, the remaining or lower half 2b being of uniform opening. The V-port portion of my valve increases the drop in pressure and restricts or decreases the flow over that which would be produced by a similar valve of uniform opening of the width of the mouth of the V-port, opened to the same extent.

In order to prevent wire drawing it has been proposed to provide a structure in which the valve is intermittent in action, i. e. it is either shut tight or wide open so that there is no wire drawing to cut out valves and seats. Wire drawing is prevented in my continuous flow regulator by means of the V-port valve 2.

The variable pressure on the upper side of the diaphragm, which due to the sensitivity of my continuous flow fixed lever regulator, only varies between say 14 lbs. to 20 lbs. under normal operating conditions, is supplemented by the action of the weighted lever 10 tending to hold the flow valve on its seat, as shown.

In the particular embodiment of the invention illustrated in the drawings, the regulator is connected to control the outlet flow from the tower, which as an example may be an absorber, to some other point, such as to a still.

In the operation of the embodiment shown, a rise in level of the liquid in the tank or tower lifts the float or displacement body 7 in the regulator chamber 11. The float arm 12 is pivoted at 13 and counterweighted at 14 and as it rises, moves the stem 15 of the actuating valve 6 to move the valve toward closed position. The needle valve 6 approaches its seat and restricts the air flow to the upper side of the diaphragm, thus reducing the pressure at that point. The pressure on the under side of the diaphragm is then greater than the pressure above plus that due to the weighted lever, and the controlling valve opens slightly.

The valve 6 has an upper and a lower seat 6a and 6b so arranged that when moved toward the upper seat the gas or air connection is restricted and the bottom one is opened to the atmosphere through bleeder opening 16 to exhaust 17. This bleeds the pressure from above the diaphragm through pipe 5' and the bleeder port 16, and the diaphragm will be lifted by the constant pressure beneath it overcoming the weighted lever 10, and the flow controlling valve will be opened slightly to allow the liquid to flow from the tower or absorber. Further rise in the level of the liquid further restricts pressure to the upper side of the diaphragm of the controlling valve which opens wider to gring down the level of the liquid.

The proper level having been reached as the level drops, the actuating valve opens wider by reason of the float descending and increased pressure is applied to the upper side of the diaphragm to tend to close the controlling valve. If the level is very low the valve 6 may be seated on the bottom seat 6b which shuts off the bleeder connection to the atmosphere and the full gas or air pressure is admitted to the controlling valve diaphragm through pipe 5' to completely shut the controlling valve.

The present invention provides a liquid level regulator apparatus which is accurate and immediately responsive to any tendency to increase or decrease in level so that the level is maintained substantially fixed, once the controlling valve is lifted slightly with the level such as to hold the float substantially horizontal approximately in the position shown in Fig. 1, and the flow is continuous. With the regulator in operation and maintaining continuous flow, a small amount of air is liberated constantly to the atmosphere through bleeder opening 16.

This is by reason of the structure providing differential pressure on the opposite sides of the diaphragm, with the pressure on one side constant and the pressure on the opposite side from the same constant pressure supply, being varied by the sensitive float controlled actuating valve.

The device does not intermittently shut off and on, but the flow is continuous and the level of the liquid substantially fixed. The regulator is shown with the control valve very near its seat in Fig. 1 to restrict the flow but this is diagrammatic and for purposes of illustration purely and it will be understood that in operation this valve is continuously open, at least slightly when the float is at or above the substantially horizontal position shown in Fig. 1.

It will also be understood that the invention is not limited to the control of the outlet flow from the tank or tower as shown in Fig. 1, but is readily applicable by slight adjustments to control the inlet flow to the tower.

This is accomplished in the embodiment shown by the controlling valve lever being adjustable between the double loop 27. For controlling the outlet flow, the controlling valve lever is placed as shown in Fig. 1. For controlling the inlet flow, the lever is inserted so that the weight tends to hold the valve open, as shown in Fig. 1a.

The lever is thus changed from one of the third order (Fig. 1) to one of the first order (Fig. 1a) by changing the fulcrum. For controlling the inlet flow the pipe connections to the diaphragm 1 must be reversed as shown in Fig. 1a. Thus by simply reversing the pipe connections to the diaphragm and changing the position of the levers the regulator may be made to control inlet or outlet flow.

As will be apparent from the foregoing, my regulator is a continuous flow regulator, and the valve has a definite positive movement for a definite change of pressure over the diaphragm and will remain indefinitely at an intermediate position between the wide open and closed positions. The regulator, entirely automatically, controls a continuous flow due to the movement of the float and is entirely independent of hand valves or by-pass valves.

While it is possible to operate my regulator by fluid pressure from within the float chamber or tower, the invention contemplates operation by any fluid pressure medium such as air, steam, gas, or water, from an independent source. Constant pressure supply is thereby obtained.

My regulator provides for remote control of the liquid level, due to the fact that the controlling valve may be placed in any convenient position, 50 or 100 ft. if necessary, from the float chamber.

In assembling my regulator, the absorbing tank or other tank or boiler, is tapped 12 inches or more below the oil level with 1¼ inch pipe thread and nipple out far enough so that regulator chamber 11 will clear the absorbing tank. A 1¼ inch gate valve 19 should be inserted. A 1¼ inch T 20 is then placed on end, outlet up, and a 1¼ inch pipe 21 is run upward from the T 20 to the bottom of the float chamber, so that the center of the chamber is opposite the desired oil level. The absorbing tank is tapped 12 inches or more above the oil level, with ¾ inch pipe thread and nipple out to the top opening 22 of the regulator chamber, having a ¾ inch gate valve 23 in the line.

The controlling valve is placed in the oil or liquid inlet or outlet line, wherever it is practical with the end marked inlet I toward the source of supply. The upper side of the diaphragm 1 is connected with ¼ inch pipe 5' to the half union 24 on the side of the actuating valve, and the lower side is connected to the T 25 between the strainer 18 and the inlet to the actuating valve.

Air or other medium of pressure supply is connected to the inlet of the small pressure reducing regulator 26 set to supply 50 pounds to the actuating valve. For controlling outlet flow the controlling valve lever 10 is placed as shown. For inlet flow control the lever 10 is inserted between the double loop 27 so that the weight tends to hold the valve open. The two gate valves are then opened and the regulator is in operation. The top and bottom of the regulator chamber are always connected directly to the absorbing tank so that the level of the oil or other liquid is the same in both.

My liquid level regulator of the horizontal float type is designed for either low temperatures or where a temperature of 600 degrees to 800 degrees Fahrenheit is employed.

In Fig. 2 is shown the construction of the float arm 12 and its connections.

The end of the float arm 12 opposite the float is secured to shaft 13 which serves as the fulcrum for the float arm. One end of the shaft 13 extends through stuffing box 28, while the other end rests on a step bearing 29.

The stuffing box 28 is not depended upon as a necessity, since the shaft 13 is provided with a ground joint 30 which would hold the pressure if the packing in the stuffing box were removed.

To the protruding end of the shaft is keyed a bridle or lever 31 forming in effect a rigid extension of the float arm 12. The bridle extension 31 carries an adjustable counterweight 14 and adjacent the fulcrum it has a shoe 32 with an adjustable set screw 33 for lifting the stem 15 of the actuating valve.

Ball bearing races are provided, one at the inner end of the horizontal shaft 13 as shown at 34 and the other at the one end of the bridle as shown at 35.

What I claim is:

1. An automatic liquid level regulator including a diaphragm operated flow control valve a constant pressure supply independent of any pressure medium within the liquid container, said pressure supply being above atmospheric pressure means for supplying pressure from said supply to the opposite sides of said diaphragm, an actuating valve for controlling the pressure supply to one side of said diaphragm, and operating means for said actuating valve controlled by the liquid level, the pressure from said supply admitted to the other side of the diaphragm being constant and above atmospheric pressure.

2. A liquid level regulator including a diaphragm operated flow control valve, a common constant pressure supply above atmospheric pressure, means for supplying pressure from said supply to the opposite sides of said diaphragm, an actuating valve for controlling the pressure from said supply to one side of said diaphragm, the pressure from said supply admitted to the opposite side of the diaphragm being constant and above atmospheric pressure, a weighted lever supplementing the action of the controlled pressure, and operating means for said actuating valve controlled by the liquid level, whereby the flow is continuous and the liquid level substantially fixed, the flow valve remaining indefinitely at an intermediate position between the wide open and closed positions.

3. A liquid level regulator according to claim 1, in which said flow control valve comprises a double seated balanced valve body, each seat having a plurality of ports therein, said ports each extending throughout substantially the depth of each of the valve body seats, said ports each being of V-shape throughout substantially one-half of its extent with the apex toward the point of tight shut off of its valve body seat, the other half being of a width equal to the width of the widest part of the V-shaped portion and continuing from said widest part, said valve being arranged to open at the apex of the V-shaped portion and to vary the flow and pressure drop over that of a similar valve of uniform opening without the V-port, between closed and substantially half-open position, while being ineffective to vary the flow and pressure drop over that of said similar valve, between said half-open and wide open positions.

4. A liquid level regulator including a diaphragm operated flow control valve, a common constant pressure supply, means for supplying pressure from said supply to the opposite sides of said diaphragm, an actuating valve for controlling the pressure supply to one side of said diaphragm, the pressure on the opposite side of the diaphragm being constant, a weighted lever supplementing the action of the controlled pressure, and operating means for said actuating valve controlled by the liquid level, said weighted lever being adjustable to two fulcrum positions tending to move the diaphragm in one direction or the other for operating the valve for the control of outlet or inlet flow, adjustable conduit means for delivering said controlled pressure to one side or the other of said diaphragm in accordance with the adjustment of the fulcrum of the lever so that the lever always supplements the action of the controlled pressure, and adjustable conduit means for delivering said constant pressure to the side of the diaphragm opposite to the controlled pressure.

5. Apparatus according to claim 4 in which said adjustable conduit means for the said controlled and constant pressure is of a construction enabling extension thereof to provide remote control of the liquid level, said controlling valve being disposed in a position remote from the float chamber.

In testimony whereof, I affix my signature.

WILLIAM S. RALSTON.